(12) United States Patent
Chakraborty et al.

(10) Patent No.: US 9,922,335 B2
(45) Date of Patent: Mar. 20, 2018

(54) SELECTING ORGANIC CONTENT AND ADVERTISEMENTS FOR PRESENTATION TO SOCIAL NETWORKING SYSTEM USERS BASED ON USER ENGAGEMENT

(71) Applicant: Facebook, Inc., Menlo Park, CA (US)

(72) Inventors: Tanmoy Chakraborty, San Mateo, CA (US); Ke Pan, Sunnyvale, CA (US); Sourav Chatterji, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 793 days.

(21) Appl. No.: 14/279,280

(22) Filed: May 15, 2014

(65) Prior Publication Data
US 2015/0332314 A1   Nov. 19, 2015

(51) Int. Cl.
*G06F 17/30* (2006.01)
*G06Q 30/02* (2012.01)
*G06Q 50/00* (2012.01)

(52) U.S. Cl.
CPC ......... *G06Q 30/02* (2013.01); *G06Q 30/0241* (2013.01); *G06Q 30/0242* (2013.01); *G06Q 30/0246* (2013.01); *G06Q 50/01* (2013.01)

(58) Field of Classification Search
CPC .......... G06Q 30/0241; G06Q 30/0242; G06Q 30/0244; G06Q 30/0277
USPC ...................................................... 707/752
See application file for complete search history.

(56) References Cited

U.S. PATENT DOCUMENTS

| | | | |
|---|---|---|---|
| 2006/0095281 A1* | 5/2006 | Chickering | G06Q 30/02 705/37 |
| 2011/0225036 A1* | 9/2011 | Reddy | G06Q 30/02 705/14.42 |
| 2012/0166532 A1 | 6/2012 | Juan et al. | |
| 2014/0006173 A1* | 1/2014 | Li | G06Q 30/02 705/14.71 |
| 2014/0019261 A1 | 1/2014 | Hegeman et al. | |
| 2014/0156360 A1 | 6/2014 | Shalita et al. | |
| 2014/0156566 A1 | 6/2014 | Kabiljo et al. | |
| 2014/0156744 A1 | 6/2014 | Hua et al. | |

\* cited by examiner

*Primary Examiner* — Marc Filipczyk
(74) *Attorney, Agent, or Firm* — Fenwick & West LLP

(57) ABSTRACT

A social networking system dynamically adjusts a number of advertisements presented to a user along with organic content items by modifying a ranking including organic content items and advertisements. Partial engagement scores are generated for organic content items based on an expected amount of user interaction with each organic content item, and scores are generated for advertisements based on expected user interaction and bid amounts associated with each organic content item. An engagement score measuring the user's estimated interaction with a content feed including organic content items without advertisements and an additional engagement score measuring the user's estimated interaction with a content feed including organic content items and advertisements are determined from the partial engagement scores and the scores. A difference between the additional engagement score and the engagement score modifies a conversion factor used to combine expected user interaction and bid amounts to generate advertisement scores.

12 Claims, 3 Drawing Sheets

404

| | Partial Engagement Score | Position Discount | Modified Partial Engagement Score |
|---|---|---|---|
| Content Item 410A | 100 | 1 | 100 |
| Content Item 410B | 90 | 0.9 | 81 |
| Content Item 410C | 80 | 0.8 | 64 |
| Content Item 410D | 80 | 0.7 | 56 |
| Content Item 410E | 70 | 0.6 | 42 |

Engagement Score= 343

402

| | Partial Engagement Score |
|---|---|
| Content Item 410A | 90 |
| Advertisement 405 | 30 |
| Content Item 410B | 72 |
| Content Item 410C | 56 |
| Content Item 410D | 48 |
| Content Item 410E | 35 |

Additional Engagement Score= 331

402 →

| Content Item 410A | Advertisement 405 | Content Item 410B | Content Item 410C | Content Item 410D | Content Item 410E |
|---|---|---|---|---|---|
| 90 | 30 | 72 | 56 | 48 | 35 |

Partial Engagement Score

Additional Engagement Score = 331

404 →

| | Partial Engagement Score | Position Discount | Modified Partial Engagement Score |
|---|---|---|---|
| Content Item 410A | 100 | 1 | 100 |
| Content Item 410B | 90 | 0.9 | 81 |
| Content Item 410C | 80 | 0.8 | 64 |
| Content Item 410D | 80 | 0.7 | 56 |
| Content Item 410E | 70 | 0.6 | 42 |

Engagement Score = 343

FIG. 4

SELECTING ORGANIC CONTENT AND ADVERTISEMENTS FOR PRESENTATION TO SOCIAL NETWORKING SYSTEM USERS BASED ON USER ENGAGEMENT

BACKGROUND

This disclosure relates generally to social networking systems, and in particular to presenting advertisements to users of a social networking system.

Social networking systems allow users to connect to and communicate with other users of the social networking system. Users create profiles on a social networking system that are tied to their identities and include information about the users, such as interests and demographic information. The users may be individuals or entities such as corporations or charities. Because of the increasing popularity of social networking systems and the significant amount of user-specific information maintained by social networking systems, a social networking system allows users to easily communicate information about themselves to other users. For example, the social networking system generates stories describing actions performed by social networking system users and presents the stories to other social networking system users. In addition to stories, other types of organic content describing social networking system users may be presented, such as status updates, location check-ins, photos, videos, or any other suitable information.

In addition to presenting organic content describing users, a social networking system may also present advertisements to its users, allowing the social networking system to obtain revenue by charging advertisers for presentation of the advertisements. Presenting advertisements to social networking system users allows an advertiser to gain public attention for products or services or to persuade social networking system users to take an action regarding the advertiser's products, services, opinions, or causes. A conventional social networking system selects advertisements for presentation to one or more users based on bid amounts associated with various advertisements. For example, a social networking system selects and presents advertisements having maximum bid amounts to maximize the revenue obtained by the social networking system from presenting advertisements.

A social networking system may present advertisements together with organic content, such as stories describing actions performed by social networking system users. However, presenting advertisements and organic content together divides a user's attention between the advertisements and the organic content, decreasing the amount of user interaction with the organic content, which may decrease overall user interaction with the social networking system. For example, if a large number of advertisements are presented to a user, the user may become frustrated with increased difficulty in viewing stories describing actions of other social networking system users and interact less with the social networking system. Further, a user may spend more time interacting with third party systems associated with advertisements rather than the social networking system if a large number of advertisements are presented by the social networking system. Users providing a high amount of interaction with a social networking system when presented with organic content and advertisements present opportunities for the social networking system to generate additional revenue by increasing the number of advertisements presented to these users. However, this additional revenue is often unrealized by a conventional social networking system, which lacks the ability to gauge a user's amount of interaction with the social networking system.

SUMMARY

A social networking system incorporates a number of sponsored content items (e.g., advertisements) within a feed of organic content items presented to a social networking system user. The organic content items may include a content item that describes a user interaction with the social networking system or with other content, and for which the social networking system does not receive compensation for presenting in a feed. In contrast, the social networking system receives some form of compensation for the sponsored content items in the feed. Typically, the social networking system boosts a ranking score of the sponsored content items so that they are more likely to appear in the feed and/or appear in a better (e.g., higher) position in the feed. But since the sponsored content may have less value to the user than the organic content, thus displacing the organic content items in the feed, boosting their ranking versus the organic content items also tends to lower the overall quality of the feed. To meter the impact of the advertisements on the overall quality of the feed, the social networking system adjusts one or more parameters that affect the placement and/or selection of the sponsored content items in the feed.

The overall quality of a feed can be measured as a sum of partial engagement scores of each of the content items in the feed, both organic and sponsored. Accordingly, the social networking system determines a partial engagement score of the user for both the organic and sponsored content items in the feed. A partial engagement score for a content item (organic or sponsored) may be based in part on a measure of the user's expected interaction with the content item. The partial engagement score for a particular content item is also based on a position of the content item in the feed, where lower positions in the feed tend to discount the engagement score. The relative discounts of content items associated with each position may be determined using historical click-through rates for items in each position in previously presented feeds.

The social networking system computes the impact on the overall engagement score of the feed caused by the sponsored content. In one embodiment, the social networking system determines an engagement score for a feed of content items that includes organic content items without advertisements based on the partial engagement scores of the organic content items, and the social networking system determines an additional engagement score for the feed of content items that includes both organic content items and one or more advertisements based on partial engagement scores of the organic content items and the advertisements. The social networking system compares the engagement score and the additional engagement score to determine the impact, or "hit," on the engagement score caused by the sponsored content, e.g., due to the displacement of higher-quality organic content items in the feed. The social networking system then determines if this engagement score hit is too high, and if so, it adjusts one or more parameters that affect the placement and/or selection of the sponsored content items in the feed. In one embodiment, the engagement score hit it too high if it is greater than a threshold value.

One parameter that the social networking system may adjust is a conversion factor between a monetary benefit of a sponsored content item and its quality or engagement score. In various embodiments, the social networking system scores the organic and sponsored content items and then ranks them together to determine how to select and place the items in the feed. In this process, the score of an organic content item may be its engagement score, whereas the score of a sponsored content item is a combination of its engagement score and an expected monetary value to the system for presenting the sponsored content item (e.g., the bid of an advertisement). The conversion factor determines, for a sponsored content item, the relative value between the engagement score and the monetary value so that they can be combined into a single score for ranking the sponsored content item. Accordingly, adjusting the conversion factor affects how much a sponsored content item's ranking is boosted due to its bid.

For example, to modify the number of organic content items included in the feed, the social networking system modifies a conversion factor applied to bid amounts associated with sponsored content items based on the comparison between the engagement score and the additional engagement score. For example, if the engagement score is greater than the additional engagement score by at least a threshold amount, the conversion factor is modified (e.g., decreased) to increase the number of organic content items included in the feed; if the engagement score is greater than the additional engagement score by less than the threshold amount, the conversion factor is modified (e.g., increased) to decrease the number of organic content items included in the feed.

BRIEF DESCRIPTION OF THE DRAWINGS

FIG. 4 is an example of determining expected user interaction with a feed of content, in accordance with an embodiment.

The figures depict various embodiments for purposes of illustration only. One skilled in the art will readily recognize from the following discussion that alternative embodiments of the structures and methods illustrated herein may be employed without departing from the principles of described herein.

DETAILED DESCRIPTION

System Architecture

Figure 1:
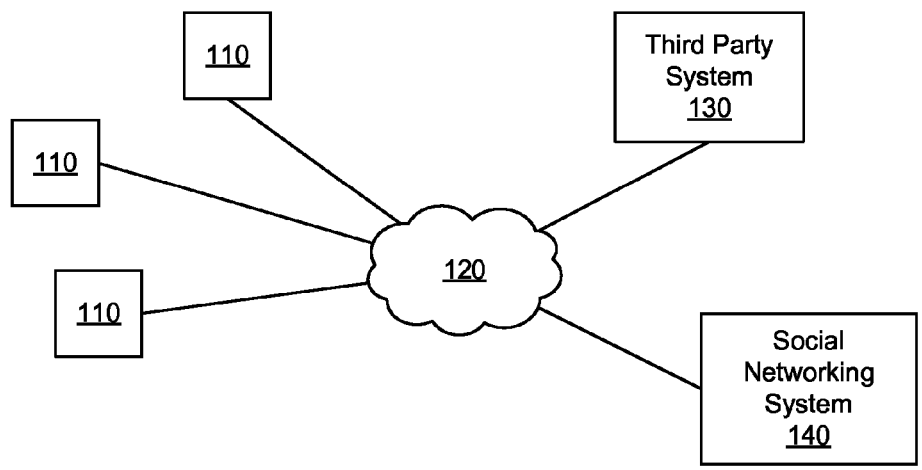
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
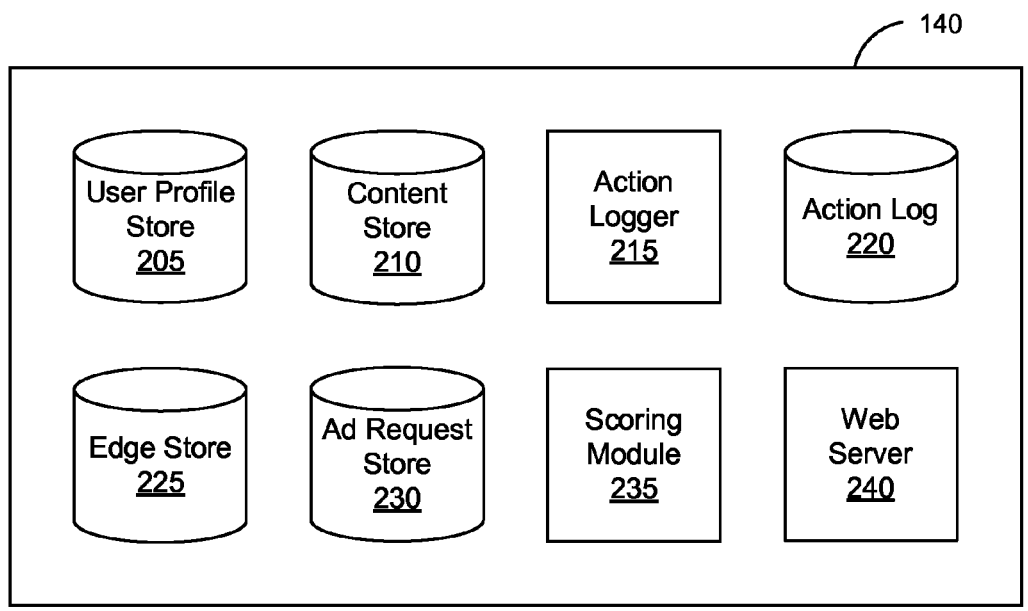
FIG. 2 is a block diagram of a social networking system, in accordance with an embodiment.

FIG. 2 is an example block diagram of an architecture of the social networking system 140. The social networking system 140 shown in FIG. 2 includes a user profile store 205, a content store 210, an action logger 215, an action log 220, an edge store 225, an ad request store 230, a scoring module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed by a user.

Additionally, an advertisement request may include one or more targeting criteria specified by the advertiser. Targeting criteria included in an advertisement request specify one or more characteristics of users eligible to be presented with advertisement content in the ad request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The scoring module 235 determines partial engagement scores measuring an expected amount of user interaction with individual organic content items (i.e., content items presented to a user by the social networking system 140 without receiving compensation for the presentation) and/or scores measuring an expected amount of user interaction while accounting for bid amounts associated with advertisements to be presented to a social networking system user via a content feed. In one embodiment, various organic content items are presented in a feed including multiple content items. For example, the social networking system 140 presents a newsfeed to a user including fifty items of organic content (e.g., stories describing actions performed by additional users connected to the user), and the scoring module 235 determines an expected amount of interaction (e.g., sharing a story with another user, expressing a preference for a story, commenting on a story, etc.) between the user and each the fifty organic content items.

The scoring module 235 determines partial engagement scores measuring an expected amount of user interaction with individual content items, including organic content items (i.e., content items presented to a user by the social networking system without receiving compensation for the presentation) scores measuring bid amounts and an expected amount of user interaction with advertisements to be presented to a social networking system user via a content feed. Based on the partial engagement scores associated with organic content items and the scores associated with advertisements, the scoring module 235 generates an engagement score measuring an expected amount of user interaction with a feed based on organic content items or advertisements included in the feed. A partial engagement score measures the expected amount of user interaction with an organic content item presented to a user in a particular location of a content feed. In some embodiments, the scoring module 235 may adjust one or more of the partial engagement scores or scores by a position discount associated with a position of the content feed in which an organic content item or an advertisement is presented. A position discount for a position reflects a decrease in expected user interaction with a content item when it is presented in the position; for example, the position discount reflects a decrease in expected user interaction with a content item or an advertisement when presented in a position relative to presentation of the content item in a reference position of the content feed. The partial engagement scores or scores may be based on information retrieved from the user profile store 205, the content store 210, the action log 220, and/or the edge store 225. For example, a partial engagement score or a score may be based on affinities between the user and an object or between the user and another user associated with various organic content items or advertisements. Additionally, prior actions associated with the user and associated with organic content items or advertisements previously presented to the user may be used to determine the expected amount of user interaction with the organic content items or advertisements to be presented. In one embodiment, user interactions with organic content items or advertisements presented within a specified time interval are retrieved from the action log 220 and used to determine the engagement score for one or more organic content items and/or advertisements.

When generating a score associated with an advertisement, the scoring module 235 accounts for a bid amount associated with the advertisement as well as an expected amount of user interaction with the advertisements. In one embodiment, the scoring module 235 applies a conversion factor to the expected amount of user interaction and the bid amount to convert the expected amount of user interaction and the bid amount to a common unit of measurement. The score associated with the advertisement is generated by combining the expected amount of user interaction and the bid amount after application of the conversion factor. For example, the conversion factor is applied to the bid amount associated with an advertisement, and the bid amount after application of the conversion factor is combined with the expected amount of user interaction with the advertisement to generate the score associated with the advertisement. Combining a bid amount with an expected amount of user interaction is further described in U.S. patent application Ser. No. 13/545,266, filed on Jul. 10, 2012, which is hereby incorporated by reference in its entirety.

Additionally, the scoring module 235 selects organic content items or advertisements for presentation to a user via a feed of content based at least in part on the partial engagement scores or the scores associated with organic content items and advertisements, respectively. For example, organic content items and advertisements are ranked together based on the partial engagement scores and scores. In some embodiments, the scoring module 235 modifies the conversion factor used to determine scores associated with advertisements based on a comparison of an engagement score for a feed including organic content items without advertisements and an additional engagement score for a feed including organic content items and advertisements to modify the number of organic content items or number of advertisements included in a feed of content presented to a user. If the conversion factor is applied to bid amounts associated with advertisements, the conversion factor is decreased if the engagement score is greater than the additional engagement score by at least a threshold amount to reduce the contribution of bid amounts to scores associated with advertisements; this increases the likelihood of organic content items being selected for presentation in the feed. Conversely, if the conversion factor is applied to scores associated with organic content items, the conversion factor is increased if the engagement score is less than the additional engagement score by at least a threshold amount to increase the contribution of bid amounts to score associated with advertisements; this decreases the likelihood of organic content items being selected for presentation in the feed of content, allowing the feed to include a greater number of advertisements. In other embodiments where the conversion factor is applied to expected amounts of user interaction associated with advertisements or to both expected amounts of user interaction and bid amounts associated with advertisements, the scoring module 235 modifies the conversion factor to increase the number of advertisements selected if the engagement score is less than the additional engagement score by at least a threshold amount and to increase the number of organic content items selected if the engagement score is greater than the additional engagement score by at least threshold amount. Modification of content selected for a content feed based on user interaction is further described below in conjunction with FIGS. 3 and 4.

The web server 240 links the social networking system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that is stored in the content store 210. Additionally, the web server 240 may provide application programming interface (API) functionality to send data directly to native client device operating systems, such as IOS®, ANDROID™, WEBOS® or BlackberryOS.

Modifying Content Item Selection Based on User Engagement

Figure 3:
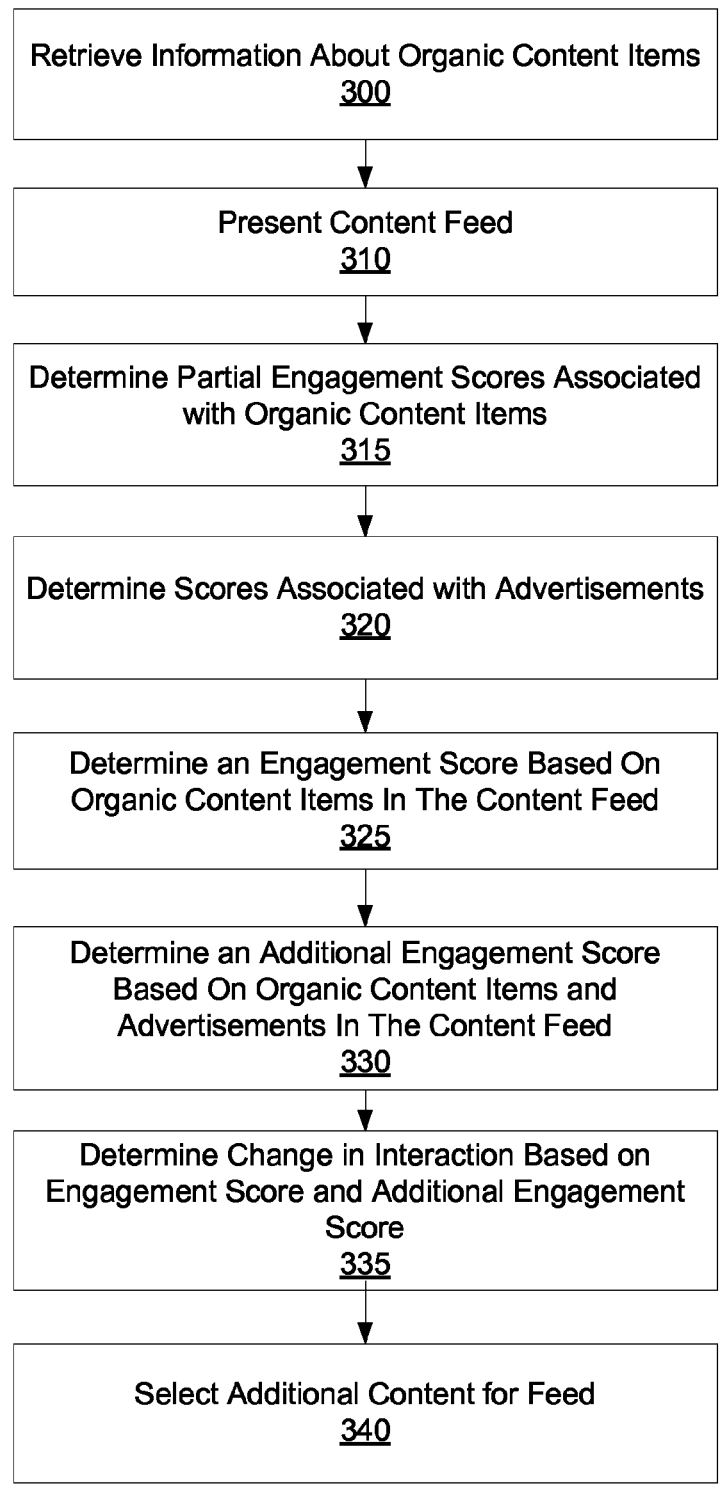
FIG. 3 is a flow chart of a method for selecting content for inclusion in a feed for presentation to a user based in part on expected user interaction with the feed, in accordance with an embodiment.

FIG. 3 is a flow chart of one embodiment of a method for modifying presentation of organic content items and advertisements to a social networking system user in a feed. The social networking system 140 retrieves 300 information about organic content items to be presented to a user when the social networking system 140 receives a request to present content items to the user. For example, the social networking system 140 retrieves 300 information describing actions performed by additional users of the social networking system 140 connected to a user and generates stories identifying the additional users and the performed actions (e.g., check-ins, page posts, status updates, upcoming events).

One or more of the organic content items are presented 310 to the user along with one or more advertisements in a content feed. For example, the social networking system 140 presents 310 a newsfeed to the user including organic content items and one or more advertisements. The content feed includes various slots, each corresponding to a position in a display. In some embodiments, some or all of the slots are associated with position discounts that may be applied to prices charged to advertisers for presenting an advertisement in a position associated with the slot. As further described above in conjunction with FIG. 2, a position discount is based at least in part on an expected change in user interaction with a content item presented in a slot other than a reference slot.

To determine a measure of quality of the presented content feed, the social networking system 140 determines 315 partial engagement scores associated with organic content items in the feed and determines 320 scores associated with advertisements included in the feed. A partial engagement score associated with an organic content item is based at least in part on an expected amount of interaction by the user with the organic content item, providing a measure of the relevance of the organic content item to the user. A score associated with an advertisement is based in part on an expected amount of interaction by the user with the advertisement as well as a bid amount associated with the advertisement. This allows the score of an advertisement to account for the monetary value to the social networking system 140 for presenting the advertisement as well as a benefit to the social networking system 140 from user interaction with the advertisement. In various embodiments, the social networking system 140 uses a conversion factor to convert the bid amount associated with the advertisement and the expected amount of interaction by the user with the advertisement into a common unit of measurement, allowing a single score associated with the advertisement to account for the expected amount of user interaction with the advertisement and the bid amount associated with the advertisement. Combining a bid amount with an expected amount of user interaction is further described in U.S. patent application Ser. No. 13/545,266, filed on Jul. 10, 2012, which is hereby incorporated by reference in its entirety.

The partial engagement scores for organic content items and the expected amount of user interaction with advertisements measure the expected amount of user interaction with an organic content item or advertisement presented in a particular location of the content feed. The expected amount of interaction between a user and an organic content item or an advertisement may be based on specific types of prior actions (e.g., commenting, expressing a preference for a content item, sharing a content item, etc.) by the user associated with previously presented organic content items or advertisements. For example, the expected amount of interaction is determined based on the user's prior indications of preference for previously presented organic content items within a specified time interval or based on the user's accessing of previously presented advertisements within a specified time interval. This determination may be based on information retrieved from the user profile store 205, the action log 220, or the edge store 225 describing interactions between the user and presented organic content items or advertisements.

Based on the partial engagement scores associated with organic content items in the content feed and scores associated with advertisements in the content feed, the social networking system 140 determines 325 an engagement score measuring the total user interaction with a content feed including the organic content items without advertisements. In some embodiments, the engagement score is determined by combining the determined partial engagement scores to obtain a total engagement score value of the content feed without advertisements. For example, the partial engagement scores of each organic content item are summed to determine 325 the engagement score. Hence, the engagement score represents expected user interaction with a content feed presenting organic content items and not presenting advertisements.

In one embodiment, content items are associated with slots in the content feed based on a ranking of content items based on user affinities for content items, prior user interactions with content items, and additional information (e.g., bid amounts associated with advertisements). To determine the engagement score of user interaction with organic content items, content items other than organic content items are removed from the ranking, with the resulting ranking of organic content items specifying the position of organic content items in a content feed (e.g., the slots of the content feed in which organic content items are presented). These positions are used to determine position discounts applied to partial engagement scores for organic content items presented in different positions of the content feed. For example, a position discount is applied to a partial engagement score associated with an organic content item based on a location in the content feed without advertisements for presenting the organic content item, and the partial engagement scores after application of the position discounts are combined to determine the engagement score.

The social networking system 140 also determines 330 an additional engagement score for a content feed including organic content items as well as advertisements. In some embodiments, partial engagement scores for the one or more of the organic content items in the content feed and scores for the one or more advertisements in the content feed are combined to determine 330 the additional engagement score. For example, the conversion factor used to generate the scores associated with advertisements results in the scores and the partial engagement scores having a common unit of measurement, so the scores and the partial engagement scores are summed to determine 330 the additional engagement score. Position discounts may be applied to the partial engagement scores or scores for organic content items or advertisements based on the slots in the content feed used to present the organic content items or advertisements in the content feed including organic content items and advertisements, with the partial engagement scores and scores combined after application of the position discounts.

Including advertisements in the content feed causes one or more organic content items to be displaced, which changes user interaction with the content feed including organic content items and advertisements relative to user interaction with a content feed including organic content items with no advertisements. Calculating the engagement score for the content feed including organic content without advertisements and the additional engagement score of the content feed including organic content and advertisements allows the change in user interaction with a content feed based on the inclusion of advertisements to be determined. Additionally, one or more of the partial engagement scores for organic content items or scores for advertisements are based in part on information about the layout with which the items are presented 310 (e.g., the proportion of presented advertisements to presented organic content items, the proportion of presented organic content items to presented advertisements, the types of presented advertisements, the placement of presented advertisements relative to presented organic content items).

Based on the engagement score for the content feed including organic content items and the additional engagement score for the content feed including organic content items and advertisements, the social networking system determines 335 a measure of a change in user interaction with a content feed including organic content items and advertisements and a content feed including organic content items without advertisements. In some embodiments, the measure of the change in user interaction is based on a difference between the engagement score for the content feed including organic content items and the additional engagement score for the content feed including organic content items and advertisements. For example, the measure of the change in user interaction is a magnitude of the difference between the engagement score for the content feed including organic content items and the additional engagement score for the content feed including organic content items and advertisements. As another example, the measure of the change in user interaction is a ratio of the difference between the engagement score for the content feed including organic content items without advertisements and the additional engagement score for the content feed including organic content items and advertisements. Hence, the measure of the change in user interaction represents an estimated change between user interaction with the content feed including organic content items and advertisements and user interaction with the content feed including organic content items without advertisements.

Referring to FIG. 4, an example determination of the engagement score, the additional engagement score, and the measure of the change in user interaction is shown. In the example of FIG. 4, an engagement score for a content feed 404 including organic content items and not including advertisements is determined based on partial engagement scores determined for various organic content items in the content feed 404 including organic content items and not including advertisements. Partial engagement scores may be calculated for a specified number of presented organic content items (e.g., for the 100 most recently presented organic content items) or over a specified period of time (e.g., over the past month) and used to determine the partial engagement scores for content items in the content feed 404 including organic content items and not including advertisements. For example, the user's expected interactions with an organic content item are determined based on the user's historical interactions with similar previously presented organic content items and is discounted based on the content item's position in the content feed.

In the example of FIG. 4, partial engagement scores are determined for each content item 410A, 410B, 410C, 401D, 410E in the content feed 404 including organic content items and not including advertisements based on prior user interactions with content items. The partial engagement scores are modified by a position discount associated with positions in the content feed in which a content item is presented, and the modified partial engagement scores combined to determine an engagement score for the content feed 404 including organic content items and not including advertisements. In the example of FIG. 4, content item 410A is presented in a position in the content feed 404 having a position discount of 1 (i.e., no position discount), while content item 410E is presented in a position in the content feed 404 having a position discount of 0.6. The partial engagement scores associated with each content item 410A, 410B, 410C, 401D, 410E, as modified by the position discount associated with positions in which the content items 410A, 410B, 410C, 401D, 410E are presented, are combined to determine 330 the engagement score. For example, the engagement score of the content feed 404 in FIG. 4 is the sum of the partial engagement scores modified by the position discounts, resulting in an engagement score of 343 for the content feed 404.

Similarly, an additional engagement score is calculated for a content feed 402 including organic content items and advertisements based on the partial engagement scores for content items and scores for advertisement. In the example of FIG. 4, the content feed 402 includes an advertisement 405 and content items 410A, 410B, 410C, 410D, 410E. As described above, partial engagement scores may be calculated for a specified number of presented organic content items and advertisements (e.g., for the 100 most recently presented organic content items and advertisements) or over a specified period of time (e.g., over the past month). For example, various values are associated with different types of interactions with each organic content item presented in a feed, and a number of occurrences of different types of interactions with a content item along with the values are used to determine a partial engagement score with an organic content item.

A score is determined for the advertisement 405 based on an estimated amount of interaction with the advertisement and a bid amount associated with the advertisement 405. A conversion factor is applied to the bid amount or to the estimated amount of interaction to convert the bid amount and the estimated amount of interaction into a common unit of measurement. When converted to a common unit of measurement, the bid amount and the estimated amount of interaction are combined to determine the score for the advertisement 405 to be combined. In the example of FIG. 4, the advertisement 405 has a score of 30, and content feed 402 has an additional engagement score of 331 based on the partial engagement scores of content items 410A, 410B, 410C, 410D, 410E and the partial engagement score of advertisement 405, partial engagement score of 30 representing a amount of user interaction with the advertisement) Note that, in this example, the inclusion of the advertisement 405 causes the partial engagement scores for content items 410A, 410B, 410C, 410D, 410E, to drop.

The social networking system 140 also determines difference between the additional engagement score and the engagement score. As further described below in conjunction with FIG. 3, the difference between the engagement score and the additional engagement score is used when selecting subsequent content items for presentation to the user. For example, the difference between the engagement score and the additional engagement score is divided by the engagement score to determine 335 a measure of a change in user interaction between a content feed presenting advertisements and organic content items and a content feed presenting organic content items without advertisements, which is used to modify selection of organic content items and advertisements for subsequent presentation in a content feed. In the example of FIG. 4, the engagement score is 343 and the additional engagement score is 331, so the measure of the change in user interaction is (343−331)/343, or 0.03.

In some embodiments, the measure of the change in user interaction with the content feed including organic content items and advertisements and a content feed including organic content items is an engagement hit score associated with an advertisement. The engagement hit score may be associated with an advertisement and is determined as a sum of differences between partial engagement scores of organic content items presented in a content feed without the advertisement and additional engagement scores of organic content items presented in a content feed including the advertisement and organic content items. For example, the social networking system 140 determines a partial engagement score for an organic content item based on an expected amount of user interaction with the organic content item and modifies the partial engagement score by a position discount determined from a position of the content item in the content feed without the advertisement. The social networking system 140 also determines an additional partial engagement score for an organic content item based on the expected amount of user interaction with the organic content item and modifies the additional partial engagement score by a position discount determined from a position of the content item in a content feed including the advertisement. Including the advertisement in a content feed displaces one or more organic content items by presenting the organic content items in different positions than they would be presented in a content feed that does not include the advertisement. Differences between the modified partial engagement score and the modified additional partial engagement scores for organic content items that are displaced by presentation of the advertisement (i.e., organic content items presented in a different position in the content feed without the advertisement than in the content feed with the advertisement) are determined and combined to determine an engagement hit score associated with the advertisement.

The social networking system 140 compares the engagement hit score associated with the advertisement to a threshold value, and adjusts the conversion factor used to generate scores associated with advertisements based on the comparison. For example, if the engagement hit score is greater than a threshold value, the social networking system 140 decreases a conversion factor applied to bid amounts associated with advertisements, reducing scores associated with advertisements. As another example, if the engagement hit score is less than a threshold value, the social networking system 140 increases the conversion factor applied to bid amounts associated with advertisements, increasing scores associated with advertisements. This allows the social networking system 140 to decrease or increase the likelihood of advertisements being presented in a content feed. In some embodiments, the adjusted conversion factor may be used to modify positions of content items in a content feed presented to the user or may be used to select 340 organic content items or advertisements included in a subsequent content feed based on partial engagement scores associated with organic content items or scores associated with advertisements.

In some embodiments, the social networking system 140 determines engagement hit scores associated with an advertisement based on multiple content feeds and generates an average engagement hit score associated with the advertisement. The average engagement hit score associated with the advertisement is used to determine how to modify the conversion factor. For example, the average engagement hit score is compared to a threshold value, and the conversion factor is decreased if the average engagement hit score exceeds the threshold value. As another example, the conversion factor is increased if the average engagement score is less than the threshold value.

When selecting 340 additional content for inclusion in the content feed, the social networking system 140 accounts for the measure of change in user interaction between the engagement score and the additional engagement score. In one embodiment, organic content items and advertisements are ranked based on the partial engagement scores of the organic content items and the scores of the advertisements, and organic content items or advertisements having at least a threshold position in the ranking are selected 340 for inclusion in the content feed. To account for a difference between the engagement score and the additional engagement score when selecting 340 additional content, the social networking system 140 modifies the conversion factor used to generate scores for advertisements. In one embodiment, modifying the conversion factor increases or decreases the contribution of an advertisement's bid amount to its score; hence, modifying the conversion factor affects a position in a ranking for advertisements, changing the likelihood of the social networking system 140 selecting 340 advertisements for inclusion in the content feed.

For example, if the engagement score is greater than the additional engagement score by at least a threshold amount and the conversion factor is applied to advertisement bid amounts, the conversion factor used to determine 320 scores associated with advertisements is modified to decrease the contribution of an advertisement's bid amount to the advertisement's score, which reduces the position of the advertisement in a ranking of organic content items and advertisements based on partial engagement scores and scores, respectively, increasing the number of organic content items selected for inclusion in the content feed. In the preceding example, if the engagement score is less than the additional engagements score by at least a threshold amount, the conversion factor is modified to increase the contribution of an advertisement's bid amount to the advertisement's score, which increases the position of the advertisement in the ranking of organic content items and advertisements, decreasing the number of organic content items, which increases the number of advertisements, included in the content feed. However, in other embodiments, the conversion factor may be applied to the expected amount of user interaction with an advertisement and modified to increase the number of organic content items selected 340 for inclusion in a content feed if the engagement score is greater than the additional engagement score by at least a threshold amount and modified to decrease the number of organic content items selected 340 for inclusion in the content feed if the engagements core is less than the additional engagement score by at least a threshold amount. The content feed including the selected content items is communicated to a client device associated with a user for presentation.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

receiving a request to present a content feed to a user of a social networking system, the content feed including one or more content items and one or more advertisements, wherein each of the one or more advertisements is associated with a bid amount;

generating a partial engagement score for each of the one or more content items, wherein the partial engagement score is based at least in part on an expected amount of interaction by the user with each of the one or more content items;

generating a contribution score associated with each of the one or more advertisements based at least on the bid amount associated with each of the one or more advertisements, an expected amount of interaction with each advertisement by the user, and a conversion factor associated with each of the one or more advertisements, wherein the conversion factor is a common unit of measurement for the bid amount and the expected amount of interaction with each advertisement;

determining an engagement score measuring an estimated interaction of the user with the content feed including the one or more content items presented without advertisements based at least on the partial engagement score for each of the one or more content items, wherein determining the engagement score comprises:

determining a position associated with each of the one or more content items in the content feed, the content feed including the one or more content items presented without advertisements, determining a position discount for the position associated with each of the one or more content items in the content feed, generating a modified partial engagement score for each of the one or more content items in the content feed, the modified partial engagement score being based at least on the partial engagement score for each of the one or more content items and the determined position discount, and further determining the engagement score based at least on the modified partial engagement score for each of the one or more content items;

determining an additional engagement score measuring an additional estimated interaction of the user with the content feed including the one or more content items presented in conjunction with the one or more of advertisements based at least on the partial engagement score for each of the one or more content items and the contribution score associated with each of the one or more advertisements;

selecting content for inclusion in the content feed from the one or more content items and the one or more advertisements based at least on the partial engagement score for each of the one or more content items, the contribution score associated with each of the one or more advertisements, the engagement score, and the additional engagement score, wherein the content for inclusion in the content feed is further selected based on a difference between the engagement score and the additional engagement score, and wherein the additional engagement score is with reference to respective content items in a ranked order; and adding the selected content to the content feed for display.

2. The method of claim 1, wherein generating the contribution score associated with each of the one or more advertisements based at least in part on the bid amount associated with each of the one or more advertisements, the expected amount of interaction with each advertisement by the user, and the conversion factor associated with each of the one or more advertisements, further comprises:

modifying the bid amount associated with each of the one or more advertisements by applying the conversion factor to the bid amount to produce a modified bid amount associated with each of the one or more advertisements; and generating a particular contribution score associated with a particular advertisement of the one or more advertisements by combining the expected amount of interaction with the particular advertisement by the user with the modified bid amount associated with the particular advertisement.

3. The method of claim 2, wherein selecting content for inclusion in the content feed from the one or more content items and the one or more advertisements comprises:

modifying the conversion factor based at least in part on a comparison between the engagement score and the additional engagement score;

applying the modified conversion factor to the bid amount associated with each of the one or more advertisements;

generating the contribution score associated with each advertisement based at least in part on the expected amount of interaction with each advertisement by the user and the bid amount associated with each advertisement after applying the modified conversion factor; and ranking the one or more advertisements and the one or more content items based at least in part on the contribution score associated with each of the one or more advertisements and the partial engagement score for each of the one or more content items.

4. The method of claim 3, wherein modifying the conversion factor based at least in part on the comparison between the engagement score and the additional engagement score comprises:

increasing the conversion factor if the engagement score is less than the additional engagement score by at least a threshold amount.

5. The method of claim 3, wherein modifying the conversion factor based at least in part on the comparison between the engagement score and the additional engagement score comprises:

decreasing the conversion factor if the engagement score is greater than the additional engagement score by at least a threshold amount.

6. The method of claim 1, wherein generating the partial engagement score for each of the one or more content items comprises:

determining one or more types of interactions with content items previously presented to the user and having at least a threshold measure of similarity with at least one of the one or more content items;

associating a value with each type of interaction;

determining a number of occurrences of each type of interaction; and generating the partial engagement score for each content item based at least in part on a number of occurrences of the one or more types of interactions with the content item and values associated with the one or more types of interactions.

7. The method of claim 6, wherein a type of interaction is selected from a group consisting of: indicating a preference for a content item, sharing the content item with another user of the social networking system, and commenting on the content item.

8. A computer program product comprising a computer-readable storage medium having instructions encoded thereon that, when executed by a processor, cause the processor to:

receive a request to present a content feed to a user of a social networking system, the content feed including one or more content items and one or more advertisements, wherein each of the one or more advertisements is associated with a bid amount;

generate a partial engagement score for each of the one or more content items, wherein the partial engagement score is based at least on an expected amount of interaction by the user with each of the one or more content items;

generate a contribution score associated with each of the one or more advertisements based at least on the bid amount associated with each of the one or more advertisements, an expected amount of interaction with each advertisement by the user, and a conversion factor associated with each of the one or more advertisements, wherein the conversion factor is a common unit of measurement for the bid amount and the expected amount of interaction with each advertisement;

determine an engagement score measuring an estimated interaction of the user with the content feed including the one or more content items presented without advertisements based at least on the partial engagement score for each of the one or more content items, wherein determine the engagement score comprises:

determine a position associated with each of the one or more content items in the content feed, the content feed including the one or more content items presented without advertisements, determine a position discount for the position associated with each of the one or more content items in the content feed, generate a modified partial engagement score for each of the one or more content items in the content feed, the modified partial engagement score being based at least on the partial engagement score for each of the one or more content items and the determined position discount, and further determine the engagement score based at least on the modified partial engagement score for each of the one or more content items;

determine an additional engagement score measuring an additional estimated interaction of the user with the content feed including the one or more content items presented in conjunction with the one or more of advertisements based at least on the partial engagement score for each of the one or more content items and the contribution score associated with each of the one or more advertisements;

select content for inclusion in the content feed from the one or more content items and the one or more advertisements based at least on the partial engagement score for each of the one or more content items, the contribution score associated with each of the one or more advertisements, the engagement score, and the additional engagement score, wherein the content for inclusion in the content feed is further selected based on a difference between the engagement score and the additional engagement score, and wherein the additional engagement score is with reference to respective content items in a ranked order; and add the selected content to the content feed for display.

9. The computer program product of claim 8, wherein generate the contribution score associated with each of the one or more advertisements based at least in part on the bid amount associated with each of the one or more advertisements, the expected amount of interaction with each advertisement by the user, and the conversion factor associated with each of the one or more advertisements, further comprises:

modify the bid amount associated with each of the one or more advertisements by applying the conversion factor to the bid amount to produce a modified bid amount associated with each of the one or more advertisements; and generate a particular contribution score associated with a particular advertisement of the one or more advertisements by combining the expected amount of interaction with the particular advertisement by the user with the modified bid amount associated with the particular advertisement.

10. The computer program product of claim 9, wherein select content for inclusion in the content feed from the one or more content items and the one or more advertisements comprises:

modify the conversion factor based at least in part on a comparison between the engagement score and the additional engagement score;

apply the modified conversion factor to the bid amount associated with each of the one or more advertisements;

generate the contribution score associated with each advertisement based at least in part on the expected amount of interaction with each advertisement by the user and the bid amount associated with each advertisement after applying the modified conversion factor; and rank the one or more advertisements and the one or more content items based at least in part on the contribution score associated with each of the one or more advertisements and the partial engagement score for each of the one or more content items.

11. The computer program product of claim 10, wherein modify the conversion factor based at least in part on the comparison between the engagement score and the additional engagement score comprises:

increase the conversion factor if the engagement score is less than the additional engagement score by at least a threshold amount.

12. The computer program product of claim 10, wherein modify the conversion factor based at least in part on the comparison between the engagement score and the additional engagement score comprises:

decrease the conversion factor if the engagement score is greater than the additional engagement score by at least a threshold amount.

* * * * *